W. F. L. BETH.
SHAKING DEVICE FOR CLEANING FILTERS.
APPLICATION FILED OCT. 27, 1919.
1,389,481.
Patented Aug. 30, 1921.
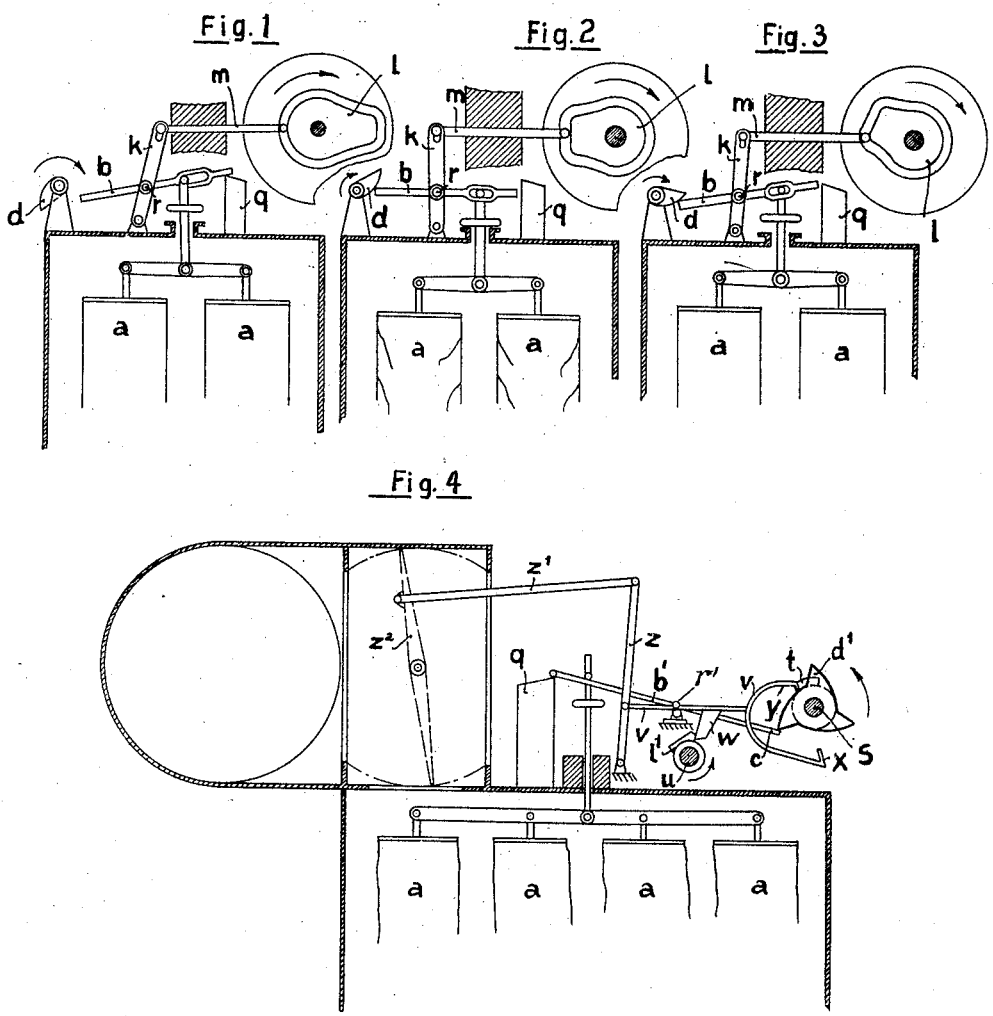

UNITED STATES PATENT OFFICE.

WILHELM FRIEDRICH LUDWIG BETH, OF LÜBECK, GERMANY.

SHAKING DEVICE FOR CLEANING FILTERS.

1,389,481.  Specification of Letters Patent.  Patented Aug. 30, 1921.

Application filed October 27, 1919. Serial No. 333,843.

*To all whom it may concern:*

Be it known that I, WILHELM FRIEDRICH LUDWIG BETH, manufacturer, residing at Lübeck, Republic of Germany, have invented certain new and useful Improvements in Shaking Devices for Cleaning Filters, (for which I have filed an application in Germany, Sept. 9, 1918,) of which the following is a specification.

My invention refers to tubular filters and more especially to improvements in shaking devices for cleaning such filters. Its particular object is to lessen friction and wear and thereby to save power and material in cleaning the filters.

As is well known to those skilled in the art, the periodical cleaning of dust filters, particularly of the tubular type, is effected either by repeatedly gently releasing the filters which have been stretched during filtration and then suddenly stretching them again, or by gently stretching the filters which were hanging in slack condition during filtration and then suddenly allowing them to fall back into their initial position and to bound against a stop which limits their movements, or by slackening the filters, which have been stretched during filtration, and then shaking them by gently stretching them and permitting them to suddenly fall back and to bound against a stop.

My invention has special reference to the third class of filters just mentioned, the cleaning device generally consisting of a cam rotating with relatively great vedocity, the lever carrying the filters being carried from time to time into the way of said cam by means of a slowly rotating member. If it is desired to effect filtration while the filters are in a stretched condition, and to effect the cleaning by tightening and then relaxing the filter against a stop, the filters must be supported in their stretched position during filtration, this being effected by aid of the slowly rotating member which consists preferably consisting of a cam disk whose surface serves, while filtration in going on, as a rest for the lever carrying the filters. This arrangement, however has a disadvantage in that it involves incessant friction and consequent unnecessary wear and waste of energy.

The shaking device according to the present invention avoids the drawback just mentioned in a particularly simple manner.

In the accompanying drawings, which show various embodiments of my invention:

Figures 1 to 3 are diagrammatic views of a shaking device such as shown and described in United States Letters Patent No. 832,450, granted to myself, having my present invention applied to it.

Fig. 4 is a view similar to Figs. 1 to 3 showing a modified form of my improved shaking device, and Figs. 5 and 6 show details of the shaking device of my U. S. Patent No. 832,450 having another modification of my present invention applied to it.

Referring to the drawings, $l$ is the slowly rotating cam disk and $b$ is the double-armed lever supporting the filter tubes $a$, said lever being linked to a rocking lever $k$. A rod $m$ engaging in the cam slot carries the free arm of lever $b$ into the path of the rotary cam $d$ (Fig. 2), the cleaning of the filters being then effected by lifting and releasing them repeatedly until the cam disk $l$ again withdraws the lever $m$ from the path of the cam $d$ (Fig. 1). In the arrangement just described the filters are assumed to have been hanging in a stretched condition while filtration was going on.

In order to leave the filters stretched after cleaning, I provide a stationary support such as $q$ serving as a rest for the rear end of the double-armed lever $b$, as this latter is withdrawn from the cam $d$, provided that this withdrawal takes place at a time when this rear end of the lever $b$ is in a lifted position, that is to say, when the filters are stretched. This is effected, as shown in Fig. 3, by a corresponding position of the cam $d$ relatively to that part of the cam slot which causes the double-armed lever to be withdrawn.

The well known shaking device illustrated in Fig. 4 offers the advantage, that the advancing of the double-armed shaking lever $b'$ into the path of the shaking cam $d'$ as well as the movement of the said lever onto the stationary support $q$ is merely started by the slowly rotating cam disk $l'$, while the movement is effected by means of the cam shaft, which rotates quicker, so that this movement does not take place slowly but quickly.

To effect this, two double-armed levers are pivotally connected in juxtaposition to a horizontally displaceable pivot $r'$, one of them, the shaking lever $b'$, carrying the filters $a$ and having its right hand end acted upon by the triple shaking cam $d^1$, while the other lever ($v$) serves to effect the displacing of the pivot $r'$ by aid of a cam arranged on cam shaft $s$ in the following manner: whenever the lifting cam $l^1$ arranged on the slowly rotating shaft $u$ lifts the lever $v$ on the right hand side by means of its projection $w$, the lower arm $x$ of its forked end is carried in the way of the cam $t$ which then shifts the pivot $r'$ so far to the right that the right hand end of the shaking lever $b'$ is carried in the way of the triple shaking cam $d^1$. At the same time lever $v$ in being moved causes the air valve $z^2$ to be reversed by aid of levers $z$, $z^1$. In addition the left hand end of the shaking lever $b'$ glides off the stationary support $q$ arranged in accordance with the present invention, the filters $a$ hanging down from said lever being thereby slackened. By alternately pressing down and releasing the right hand end of the shaking lever $b'$ the triple cam causes the filters to be cleaned until the lifting cam $l^1$ has passed underneath the projection $w$ and the forked lever $v$ descends again on the right, thus carrying the upper arm $y$ in the way of cam $t$, which thereupon shifts the pivot $r'$ again to the left at a time when one of the steps of cam $d^1$ still holds the right end of the shaking lever $b'$ in a depressed position, its left end being thus lifted and being carried, when the lever $b'$ is shifted to the left, onto the stationary support $q$, thus preventing the filters from again dropping. The filters now remain tightly stretched, while filtration is going on, until another revolution of shaft $u$ carrying cam $l^1$ causes the shaking procedure to be started afresh.

In the modification shown in Figs. 5 and 6 the pivot of the shaking lever $b$ is stationary, the shaking cam $d^2$ being displaced together with the support $q^2$ which is thereby carried underneath the lifted end of the shaking lever $b$. As shown in the drawing, cam $d^2$ and support $q^2$ are disposed on a slide $q^1$ mounted in guides $p^1$ on the filter casing and being provided with a longitudinal slot $q^3$ allowing the filter carrier $p^2$ to pass. Slide $q^1$ is operated by cam disk $l$ through the medium of connecting rod $m$.

I claim:—

1. In a filter shaking device, in combination, a double-armed lever, a filter supported by one arm of said lever, a rotary cam adapted to act on the other arm of said lever, a support for the filter-carrying lever arm, and means for alternately bringing the filter-carrying lever arm into operative contact with said support and the other lever arm into operative contact with said cam.

2. In a filter shaking device, in combination, a double-armed lever, a filter supported by one arm of said lever, a rotary cam adapted to act on the other arm of said lever, a support for the filter carrying lever arm and means for alternately displacing said lever in the direction of said cam or of said support.

3. In a filter shaking device, in combination, a double-armed lever, a filter supported by one arm of said lever, a rotary cam adapted to act on the other arm of said lever, a support for the filter carrying lever arm, a rocking lever connected with said double-armed lever and a cam disk serving to rock said rocking lever so as to alternately bring the filter-carrying lever arm and the other lever arm, respectively, into operative contact with said support and with said cam.

4. In a filter shaking device, in combination, a double-armed lever, a filter supported by one arm of said lever, a rotary cam adapted to act on the other arm of said lever, a support for the filter carrying lever arm, a rocking lever connected with said double-armed lever and a cam disk serving to rock said rocking lever so as to alternately displace said lever in the direction of said cam and of said support.

In testimony whereof I have affixed my signature in presence of two witnesses.

WILHELM FRIEDRICH LUDWIG BETH.

Witnesses:
EDWARD WOLFULM STRAUS,
GERMAINE ROBERT GLINKOR.